(12) United States Patent
Raju (10) Patent No.: US 11,811,301 B1
(45) Date of Patent: Nov. 7, 2023

(54) AC SOLID-STATE TRANSFORMER WITH DC-DC CONVERTERS

(71) Applicant: Ravisekhar Raju, Clifton Park, NY (US)

(72) Inventor: Ravisekhar Raju, Clifton Park, NY (US)

(*) Notice: Subject to any disclaimer, the term of this patent is extended or adjusted under 35 U.S.C. 154(b) by 0 days.

(21) Appl. No.: 18/224,541

(22) Filed: Jul. 20, 2023

(51) Int. Cl.
*H02J 3/46* (2006.01)
*H02M 7/5387* (2007.01)
*H02M 1/00* (2006.01)
*H02M 3/335* (2006.01)

(52) U.S. Cl.
CPC ....... *H02M 1/008* (2021.05); *H02M 3/33571* (2021.05); *H02M 3/33576* (2013.01)

(58) Field of Classification Search
CPC .................. H02M 3/33571; H02M 1/008
See application file for complete search history.

(56) References Cited

U.S. PATENT DOCUMENTS

| 2012/0212984 | A1* | 8/2012 | Yamada | H02M 7/23 363/89 |
| 2012/0262966 | A1* | 10/2012 | Luerkens | H02M 3/33592 363/127 |
| 2018/0351368 | A1* | 12/2018 | Sun | H02M 3/33584 |
| 2020/0295663 | A1* | 9/2020 | Yelaverthi | H02M 1/15 |

\* cited by examiner

*Primary Examiner* — Jared Fureman
*Assistant Examiner* — Esayas G Yeshaw (57) ABSTRACT

A three-phase AC solid-state transformer is provided which comprises three DC-DC converters. Each of the DC-DC converters has an internal transformer for galvanic isolation between its input and output sides. Each of the DC-DC converters has unipolar voltage across its input terminals and unipolar voltage across its output terminals. In one embodiment, the positive input terminals of the three DC-DC converters serve respectively as the three AC input terminals of the solid-state transformer and their positive output terminals provide the three phase AC output of the solid-state transformer. The negative input terminals of the three DC-DC converters are connected together to form a first common node, while the negative output terminals are connected together to form a second common node. The first common node has a voltage offset from the neutral of the input AC phases; and the second common node has a voltage offset from the neutral of the output AC phases.

16 Claims, 11 Drawing Sheets

AC SOLID-STATE TRANSFORMER WITH DC-DC CONVERTERS

BACKGROUND

Solid-state transformers (SSTs) are an alternative to line frequency transformers. Solid-state transformers typically involve several power electronic conversion stages—the incoming AC is first rectified to DC, this DC is then fed to a DC-DC converter that includes an internal high frequency transformer for providing isolation and voltage step-up or step-down, and finally an inverter stage takes the DC output from the DC-DC converter and converts it to an AC output. The high frequency transformer used in SSTs can be significantly more compact and lightweight than line-frequency, e.g., 50 or 60 Hz transformers, thus allowing the SST to have a higher power density in spite of the added power electronic conversion stages.

A disadvantage of typical SST circuits is the need for multiple power electronic conversion stages which can add to the number of components needed and have a detrimental impact on cost and reliability.

Therefore, what is needed are techniques that overcome the above mentioned disadvantage.

BRIEF SUMMARY OF THE INVENTION

Embodiments of the invention provide an AC-AC solid-state transformer (SST) using DC-DC converters incorporating high frequency transformer isolation. The DC-DC converters have unipolar input voltage and unipolar output voltage.

In accordance with one aspect of the invention, the solid-state transformer (SST) has a three-phase AC input (denoted by A, B, and C) and a three-phase AC output (denoted by a, b, and c). The SST comprises three DC-DC converters with one DC-DC converter per phase of the three-phase system. Each of the DC-DC converters has high frequency transformer-based galvanic isolation between its input DC side and its output DC side. The DC-DC converter in a particular phase has its positive input terminal connected to the corresponding AC phase input, and its positive output terminal connected to the corresponding AC phase output. Further, all three of the DC-DC converters have their negative input terminals connected to a Y or star junction (denoted by $Y_{DC}$), and their negative output terminals connected to a second Y or star junction (denoted by $y_{DC}$).

In accordance with another aspect of the invention, the solid-state transformer (SST) has a three-phase AC input (denoted by A, B, and C) and a three-phase AC output (denoted by a, b, and c). The SST comprises three DC-DC converters with one DC-DC converter per phase of the three-phase system. Each of the DC-DC converters has high frequency transformer-based galvanic isolation between its input DC side and its output DC side. The DC-DC converter in a particular phase has its negative input terminal connected to the corresponding AC phase input, and its positive output terminal connected to the corresponding AC phase output. Further, all three of the DC-DC converters have their positive input terminals connected to a Y or star junction (denoted by $Y_{DC}$), and their positive output terminals connected to a second Y or star junction (denoted by $y_{DC}$).

In accordance with another aspect of the invention, the solid-state transformer (SST) has a three-phase AC input (denoted by A, B, and C) and a three-phase AC output (denoted by a, b, and c). The SST comprises three DC-DC converters with one DC-DC converter per phase of the three-phase system. Each of the DC-DC converters has high frequency transformer-based galvanic isolation between its input DC side and its output DC side. The DC-DC converter in a particular phase has its positive input terminal connected to the corresponding AC phase input, and its negative output terminal connected to the corresponding AC phase output. Further, all three of the DC-DC converters have their negative input terminals connected to a Y or star junction (denoted by $Y_{DC}$), and their positive output terminals connected to a second Y or star junction (denoted by $y_{DC}$).

In accordance with another aspect of the invention, the solid-state transformer (SST) has a three-phase AC input (denoted by A, B, and C) and a three-phase AC output (denoted by a, b, and c). The SST comprises three DC-DC converters with one DC-DC converter per phase of the three-phase system. Each of the DC-DC converters has high frequency transformer-based isolation between its input DC side and its output DC side. The DC-DC converter in a particular phase has its negative input terminal connected to the corresponding AC phase input, and its positive output terminal connected to the corresponding AC phase output. Further, all three of the DC-DC converters have their positive input terminals connected to a Y or star junction (denoted by $Y_{DC}$), and their negative output terminals connected to a second Y or star junction (denoted by $y_{DC}$).

According to yet another aspect of the invention, the aforementioned DC-DC converter in each phase comprises multiple DC-DC converter modules connected in series or parallel or combinations thereof such that an increased voltage or current-handling capability is achieved. In a series combination, the DC-DC converter modules form a string where the negative terminal of a DC-DC converter module is connected to the positive terminal of the subsequent DC-DC converter module such that a net higher voltage rating is achieved. In a parallel combination, the positive terminals are connected together and the negative terminals connected together such that a net higher current rating is achieved.

According to yet another aspect of the invention, the aforementioned DC-DC converters or DC-DC converter modules use a resonant or soft-switching circuit such that the switching devices therein undergo switching under substantially zero voltage or zero current conditions.

According to yet another aspect of the invention, the switches in the DC input side of the aforementioned DC-DC converter or DC-DC converter modules in a phase are turned on for a portion of the AC cycle of that phase such that a substantially zero voltage is present across the input side of the said DC-DC converter or DC-DC converter modules during that portion of the AC cycle.

Various other features and advantages will be made apparent from the following detailed description and the drawings.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention.

Figure 1:
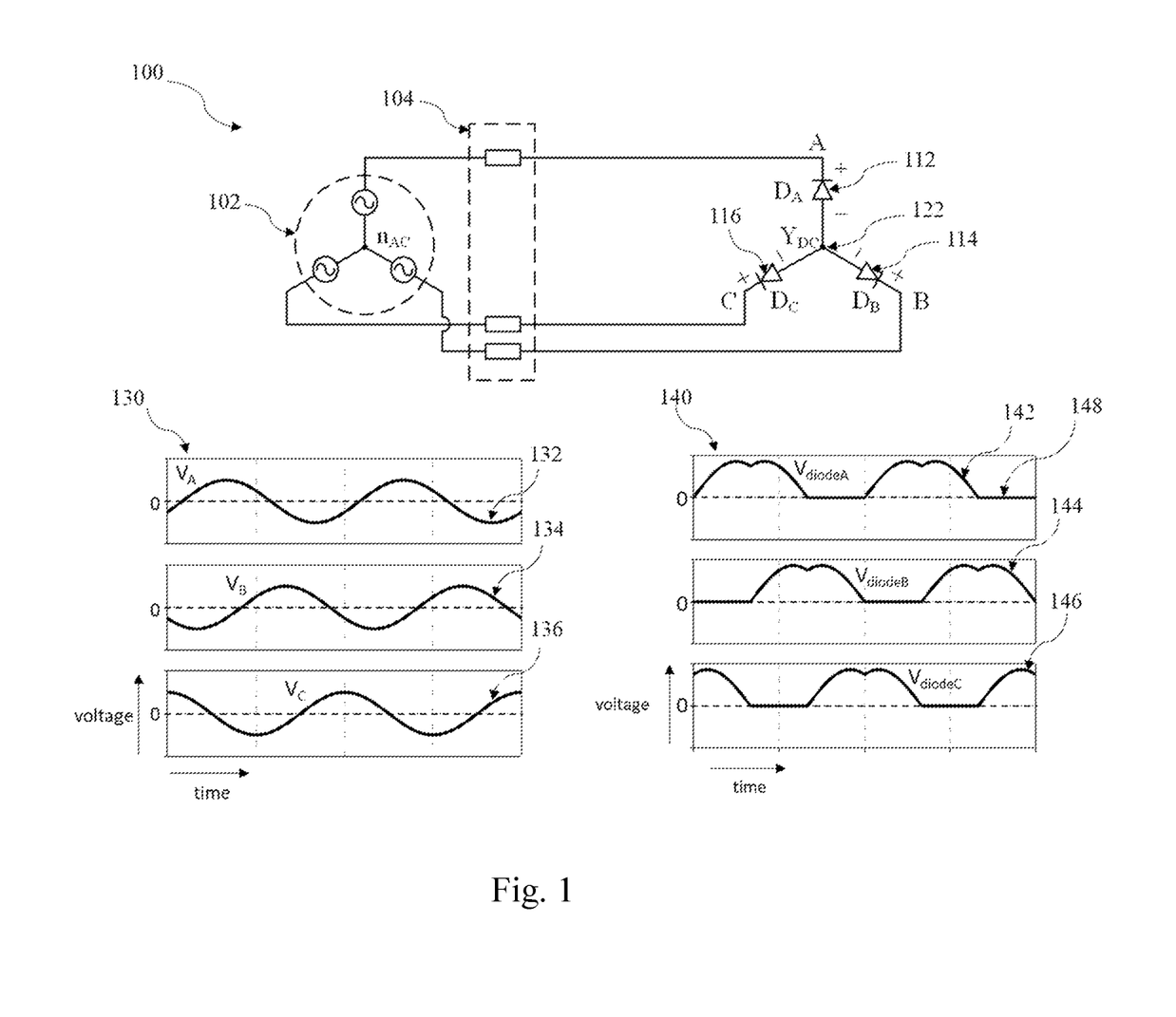
FIG. 1 illustrates an AC system with a three-phase AC source connected to a set of three diodes. The three anodes of the diodes are connected to a common junction and the three cathodes are connected to the AC source, with one cathode connected to each phase. A unipolar voltage is developed across each of the diodes with the common anode junction developing an offset voltage from the neutral voltage of the three-phase AC source.

FIG. 1 illustrates a system, 100, to derive three unipolar voltages from a three-phase AC system according to an embodiment of the present invention. The system has a three-phase source, 102, with a three-phase line impedance, 104, connected to a set of three diodes, 112, 114, and 116. The anodes of the three diodes are connected to a Y or star junction or node (denoted by $Y_{DC}$). The cathode of diode 112 (denoted by $D_A$) is connected to phase A of the AC source; while the cathode of diode 114 (denoted by $D_B$) is connected to phase B of the AC source; and the cathode of diode 116 (denoted by $D_C$) is connected to phase C of the AC source. The three phase AC voltages $V_A$, $V_B$, and $V_C$ with respect to the source neutral, $n_{AC}$, are shown by waveforms 132, 134, and 136 in graph 130. The 'back-to-back' configuration of the diodes shown in 100 will result in no current flow in the system other than through non-idealities of the diodes. Since the diodes can block voltage in only one direction, a unipolar voltage will be developed across each of the three diodes with the junction $Y_{DC}$ developing a negative voltage with respect to the AC source neutral $n_{AC}$. Graph 140 shows the unipolar voltage waveforms 142, 144, and 146, developed across the diodes connected to phases A, B, and C respectively. A zero voltage duration, 148, is shown for waveform 142 during a portion of the source AC cycle. With the three-phase AC source voltages translated to a set of three unipolar voltages as described above, the next aspects and embodiments of the invention are described below.

Figure 2:
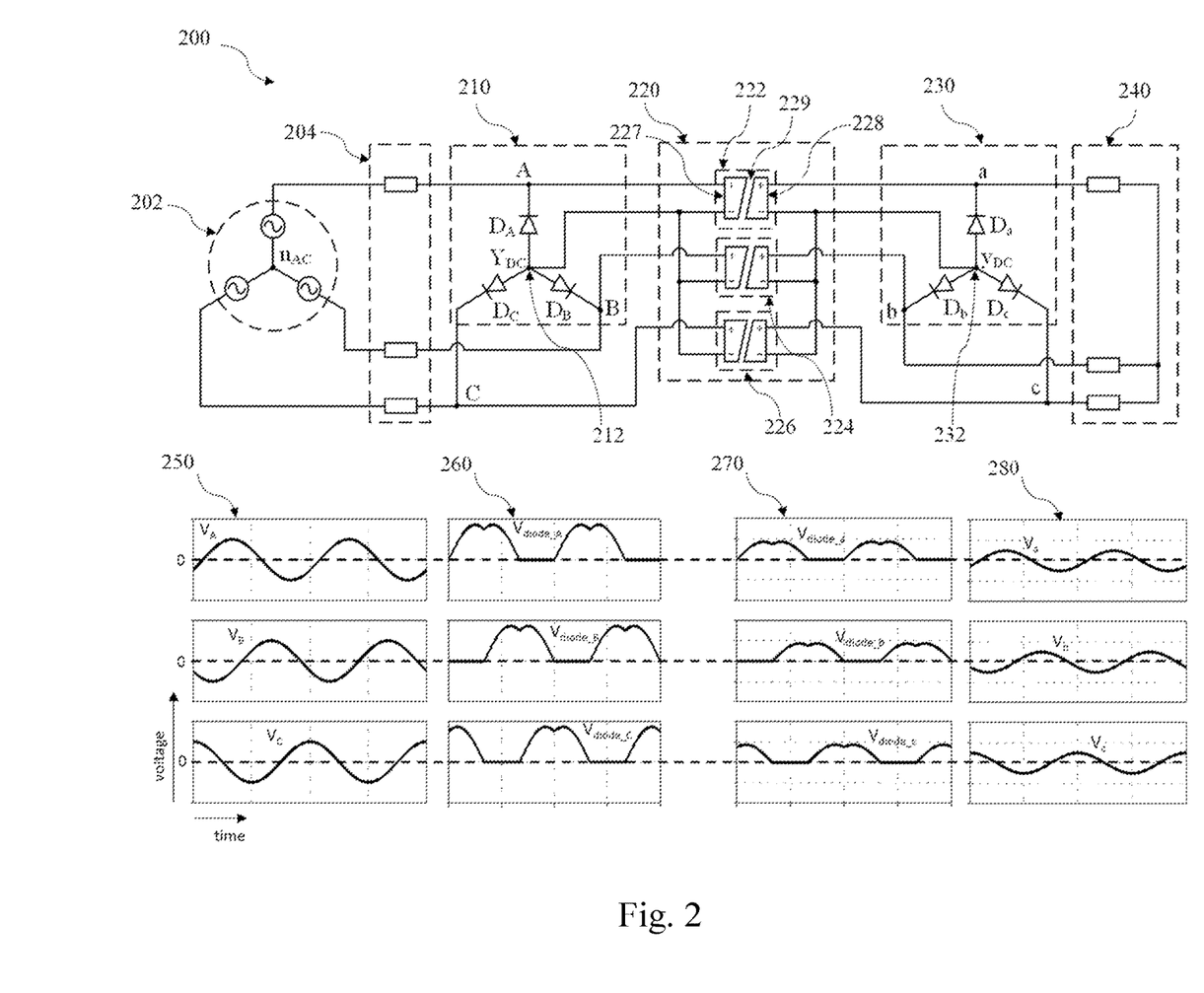
FIG. 2 illustrates a solid-state transformer according to one embodiment of the invention, wherein three DC-DC converters are connected to an AC input and provide an AC output. Although connected to an AC system, unipolar voltages are present across the inputs of the individual DC-DC converters due to sets of diodes which translate the incoming three AC phases to unipolar voltages by developing an offset between the AC source neutral and the common junction of the negative input terminals of the DC-DC converters. On the load side, AC output voltages are presented as the difference between the DC-DC converter output voltages.

FIG. 2 illustrates a system, 200, with a solid-state transformer (SST), 220, according to an embodiment of the present invention. The system has a three-phase AC source, 202, and AC source or line impedance, 204, connected to a set of three 'back-to-back' diodes connected in a fashion as indicated in the earlier description for FIG. 1. Each of the three diodes has a unipolar voltage across it and hence a DC-DC converter capable of receiving a unipolar voltage input can be connected across each of the diodes. DC-DC converters 222, 224, and 226 are connected across diodes $D_A$, $D_B$, and $D_C$ respectively with the positive voltage input terminals of the DC-DC converters connected to the cathodes of the diodes, i.e., to the AC source connections A, B, and C respectively. The negative voltage input terminals of the DC-DC converters are connected together and to the Y junction of the diodes, $Y_{DC}$. Graph 250 shows the three phase AC source voltages with respect to the AC source neutral, while graph 260 shows the unipolar input voltages across the three DC-DC converters. Each of the DC-DC converters has an input processing stage, a galvanic isolation stage consisting of a high frequency transformer, and an output processing stage. As an example, the DC-DC converter 222 for phase A has an input stage 227, an isolation stage 229, and an output stage 228. Each of the DC-DC converters receives a unipolar input voltage and converts it to a unipolar output voltage with isolation between the input and output, and optionally step-up or step-down in voltage. The outputs of the DC-DC converters are connected to a set, 230, of three-diodes that are connected in a 'back-to-back' fashion similar to the input side diode set, 210. The output voltages of the DC-DC converters are unipolar and have waveforms as shown in graph 270. The positive voltage output terminals of the three DC-DC converters are connected to a three-phase AC load, 240. The negative voltage output terminals of the three DC-DC converters are connected together and to the diodes junction node, $y_{DC}$. Although the DC-DC converters individually have output voltages with unipolar waveform as shown by graph 270, the difference between these unipolar waveforms provides AC waveforms across the SST output terminals a, b, and c. Graph 280 shows the output AC voltage waveforms available between the output phases and the neutral of the AC load, 240.

Figure 3:
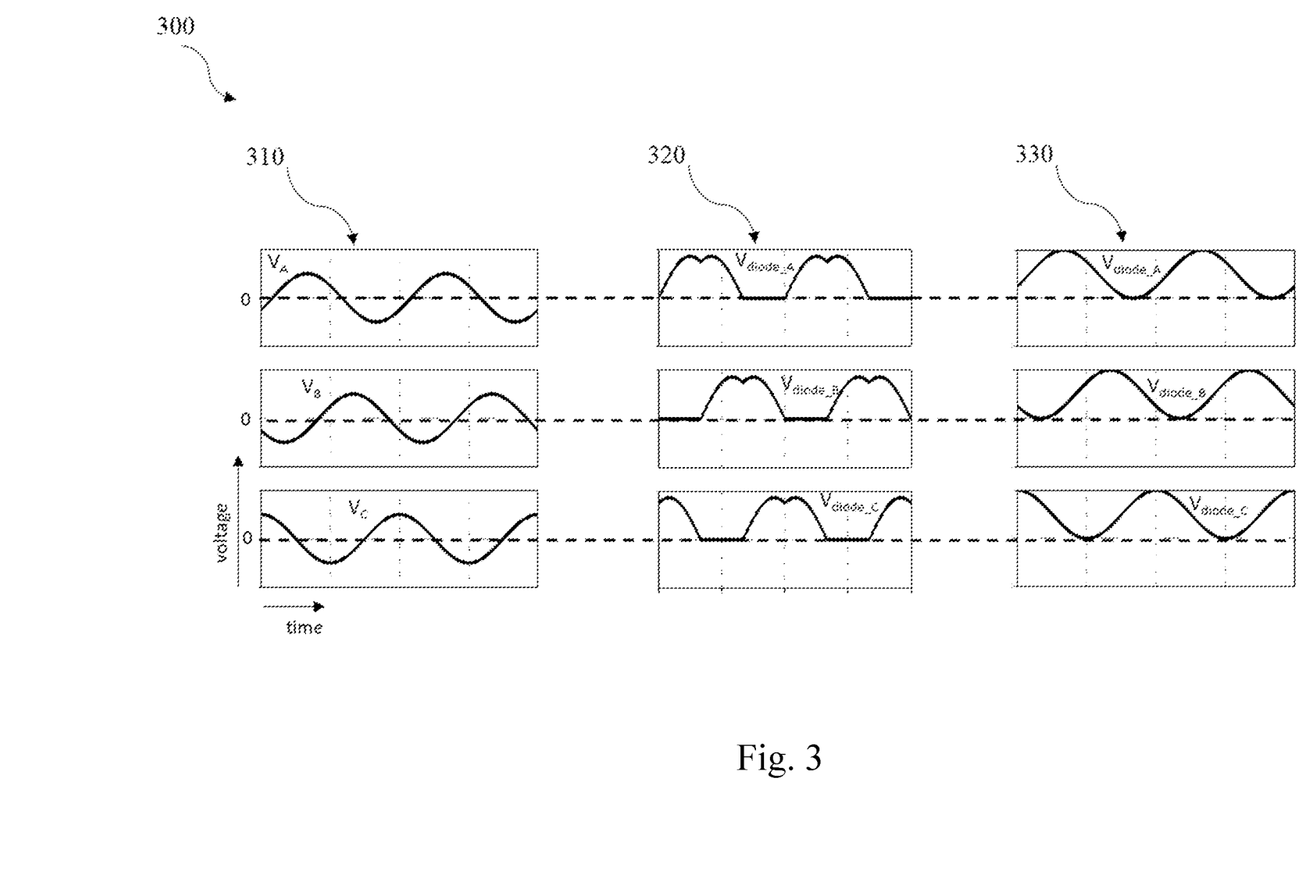
FIG. 3 illustrates the line-neutral voltages of the three phase AC source, and forms of unipolar voltages that can be developed by adding an offset to the neutral voltage. The line-line voltages in all three sets of graphs are substantially the same, i.e., algebraic difference of any two of the phase waveforms in one set is same as the algebraic difference of the corresponding two waveforms in another set. The unipolar voltages in 320 and 330 can have a zero-voltage period or can be above zero for substantially all of the AC source cycle.

FIG. 3 shows voltages waveforms for an SST according to aspects of the present invention. Graph 310 shows the AC voltage waveforms for the three phases (line-neutral) in a three-phase system. Graph 320 shows a translation of the three AC phase voltages to three unipolar voltages through addition of a common voltage such as that which develops between $Y_{DC}$ and $n_{AC}$ of FIG. 1. The line-line voltages for graphs 310 and 320 are substantially the same, i.e., the algebraic difference between any two waveforms in graph 310 and the algebraic difference between the corresponding two waveforms in graph 320 are substantially same. Graph 330 shows another set of three unipolar voltages which are sinusoidal but offset to have a minimum of zero voltage. The line-line voltages that can be derived from the waveforms in graph 330 are substantially the same as those that can be derived from the waveforms in graph 310, as is the case for the waveforms in graph 320. Other unipolar waveforms are possible as aspects of this invention.

Figure 4:
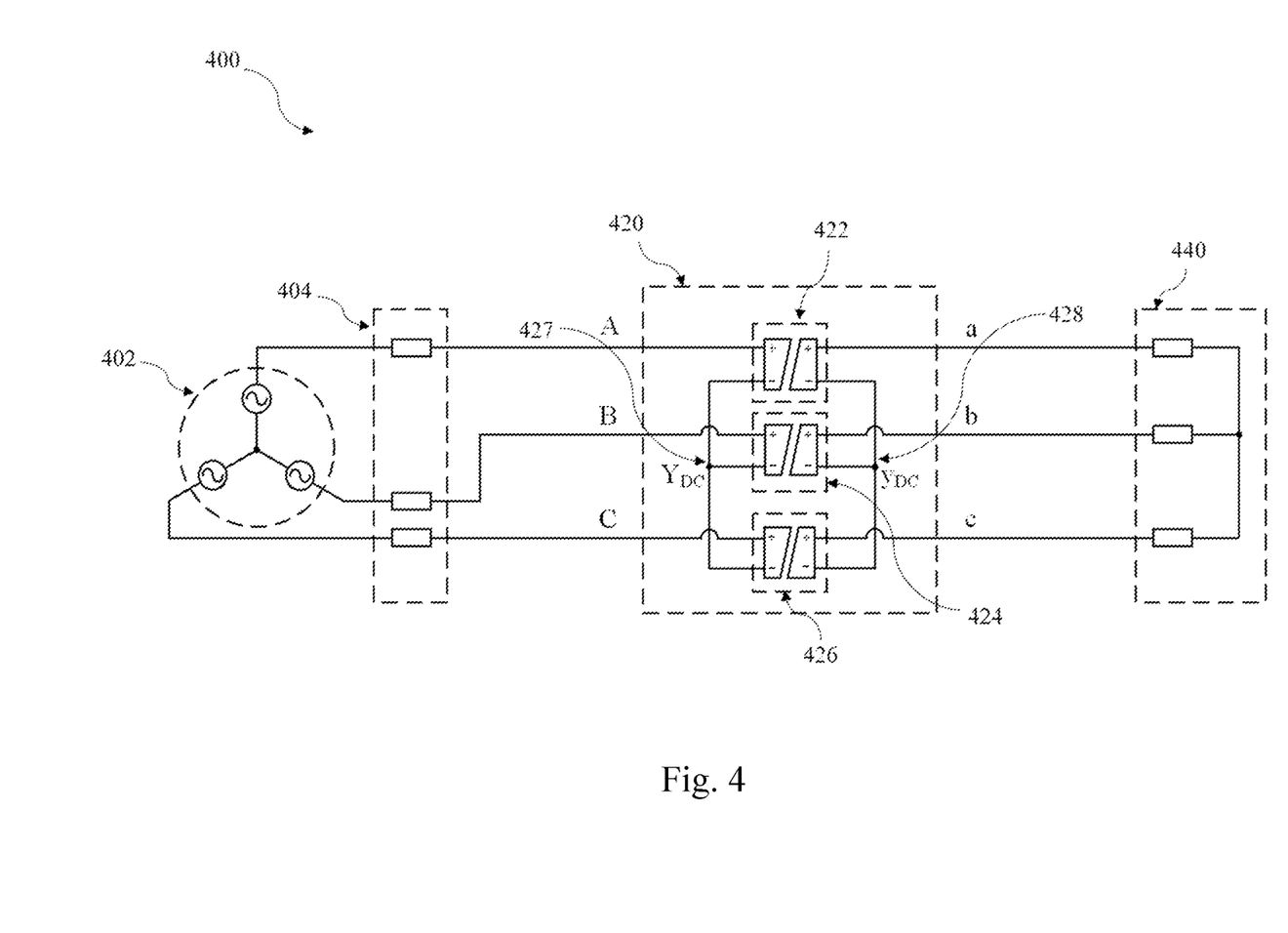
FIG. 4 illustrates an AC system with an AC source, a solid-state transformer using three DC-DC converters according to an embodiment of the invention, and an AC load. The positive input terminals of the DC-DC converters are connected to the AC source and the positive output terminals of the DC-DC converters provide an AC output across them. The negative input terminals of the DC-DC converters are connected together and the negative output terminals of the DC-DC converters are connected together.

FIG. 4 illustrates a system, 400, with a three-phase solid-state transformer (SST), 420, according to an embodiment of the present invention. The system has a three-phase AC source, 402, connected through AC source or line impedance, 404, with the input terminals A, B, and C of the SST. The SST consists of three DC-DC converters, each having an internal transformer isolation between its input and output sections. The DC-DC converters have a unipolar input voltage and a unipolar output voltage. DC-DC converters 422, 424, and 426 have their input positive voltage terminals connected to phases A, B, and C respectively of the three-phase source, 402; and their negative voltage input terminals connected to a common junction ($Y_{DC}$), 427. The positive voltage output terminals of the DC-DC converters 422, 424, and 426 form the SST output terminals a, b, and c, while their negative voltage output terminals are connected to a common junction node ($y_{DC}$), 428. Although each of the DC-DC converters provides a unipolar output voltage, the algebraic differences between their outputs appear as AC voltages across the SST terminals a, b, and c. The SST output terminals (a, b, and c) can be connected to a three-phase AC load, denoted by 440. Voltages appearing across the output terminals (a, b, and c) of the SST, 520, are substantially in-phase with respect to the voltages at the input terminals (A, B, and C). In this embodiment, the SST, 420, does not require an external diode network such as 210 and 230 shown in FIG. 2, and the DC-DC converters 222, 224, and 226 have internal freewheeling paths that replicate the functions of the external diode network as will be detailed below.

Figure 5:
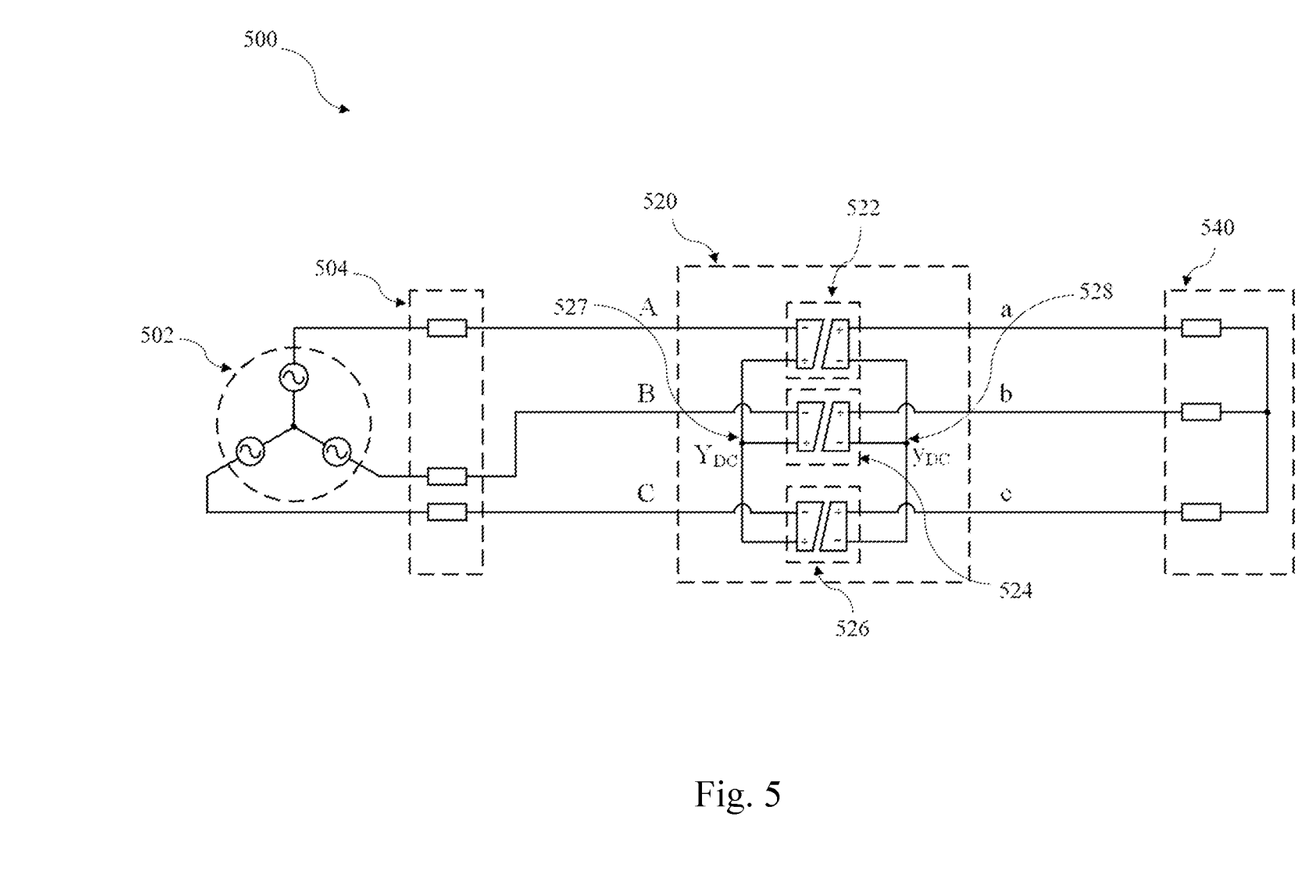
FIG. 5 illustrates a configuration similar to FIG. 4, but with the input terminal connections of the DC-DC converters reversed.

FIG. 5 shows an AC system, 500, using an SST, 520, according to another embodiment of the present invention. The mode of operation is similar to that of FIG. 4 with the difference being in the polarity reversal of the input-side connections of the DC-DC converters, 522, 524, and 526, in comparison with those of the DC-DC converters in FIG. 4. The positive voltage input terminals of the DC-DC converters in FIG. 5 are connected together to form a Y junction ($Y_{DC}$), 527, while the negative voltage input terminals are connected to the AC source phases (A, B, and C). Voltages appearing across the output terminals (a, b, and c) of the SST, 520, are substantially 180 degrees out-of-phase with respect to the voltages at the input terminals (A, B, and C).

Figure 6:
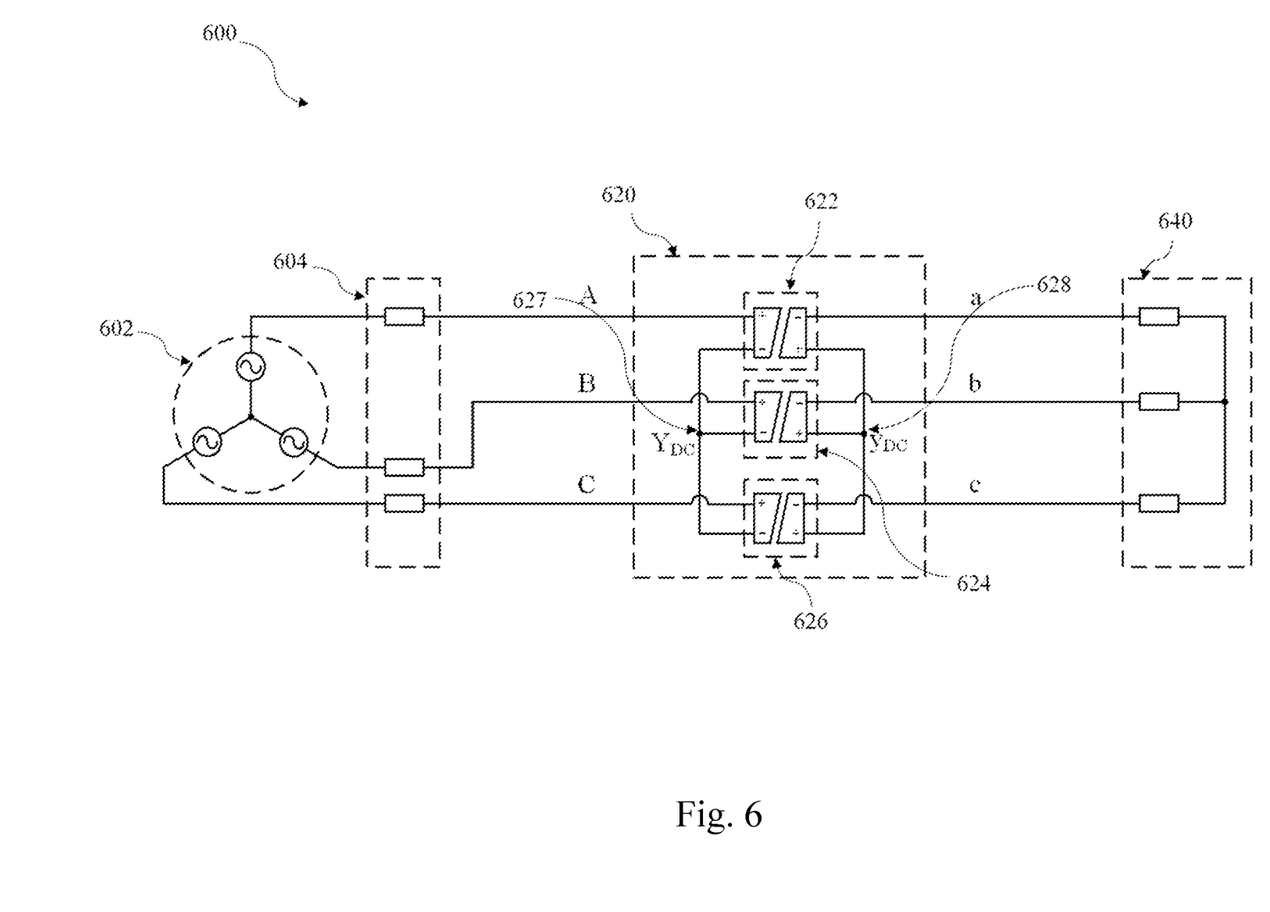
FIG. 6 illustrates a configuration similar to FIG. 4, but with the output terminal connections of the DC-DC converters reversed.

FIG. 6 shows an AC system, 600, using an SST, 620, according to yet another embodiment of the present invention. The mode of operation is similar to that of FIG. 4 with the difference being in the polarity reversal of the output-side connections of the DC-DC converters, 622, 624, and 626, in comparison with those of the DC-DC converters in FIG. 4. The positive voltage output terminals of the DC-DC converters in FIG. 6 are connected together to form a Y junction ($y_{DC}$), 628, while the negative voltage output terminals form the SST AC output terminals (A, B, and C). Voltages appearing across the output terminals (a, b, and c) of the SST, 620, are substantially 180 degrees out-of-phase with respect to the voltages at the input terminals (A, B, and C).

Figure 7:
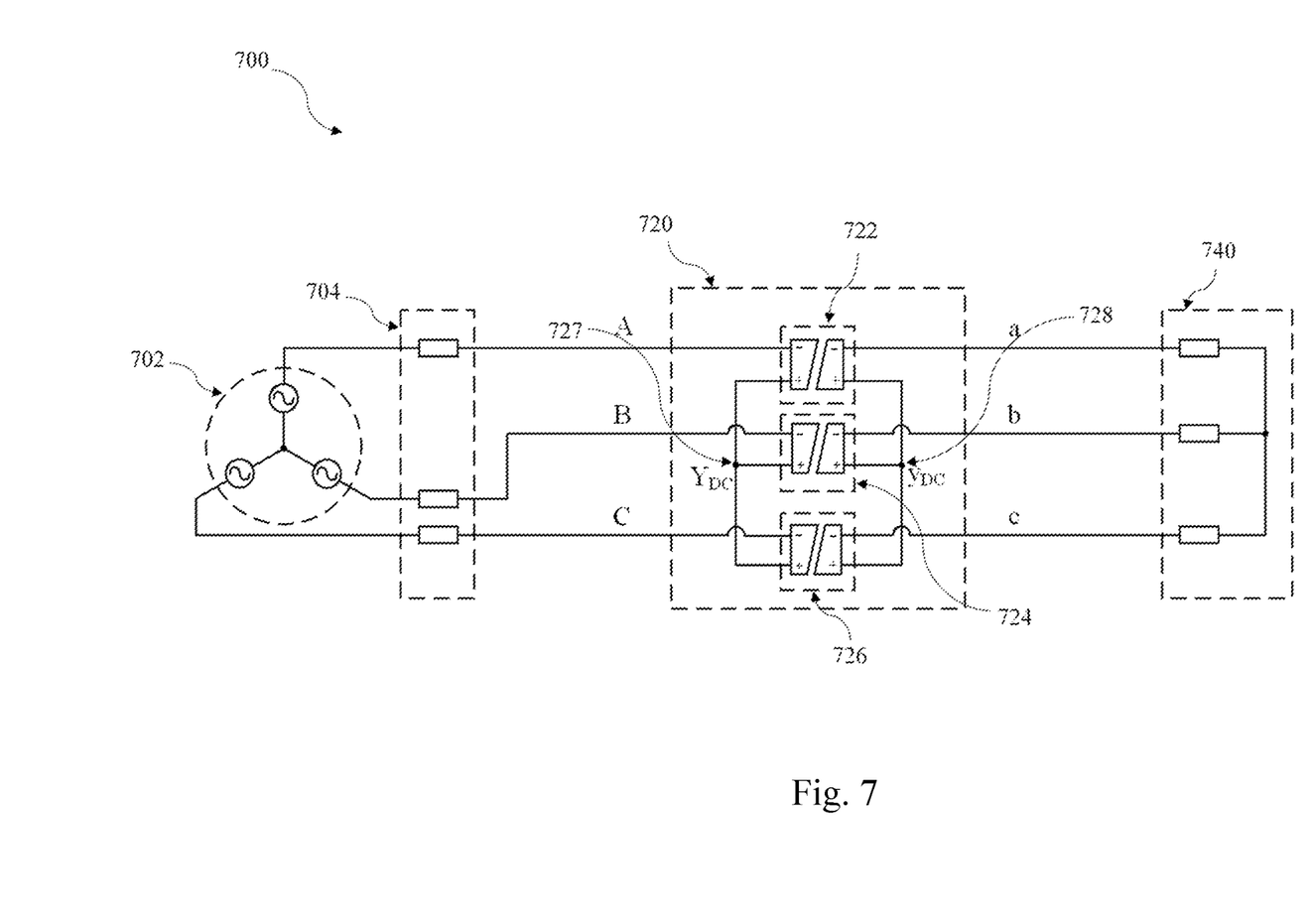
FIG. 7 illustrates a configuration similar to FIG. 4, but with both the input and output terminal connections of the DC-DC converters reversed.

FIG. 7 shows an AC system, 700, using an SST, 720, according to yet another embodiment of the present invention. The mode of operation is similar to that of FIG. 4 with the difference being in the polarity reversal of both the input-side and the output-side connections of the DC-DC converters, 722, 724, and 726, in comparison with those of the DC-DC converters in FIG. 4. The positive voltage input terminals of the DC-DC converters in FIG. 7 are connected together to form a Y junction ($Y_{DC}$), 727, while the negative voltage input terminals are connected to the AC source phases (A, B, and C). The positive voltage output terminals of the DC-DC converters in FIG. 7 are connected together to form a Y junction ($y_{DC}$), 628, while the negative voltage output terminals form the SST AC output terminals (A, B, and C). Due to the reversal of connections at both the input and the output of the DC-DC converters in FIG. 7 vis-à-vis FIG. 4, the voltages appearing across the output terminals (a, b, and c) of the SST, 720, are substantially in-phase with respect to the voltages at the input terminals (A, B, and C).

Figure 8:
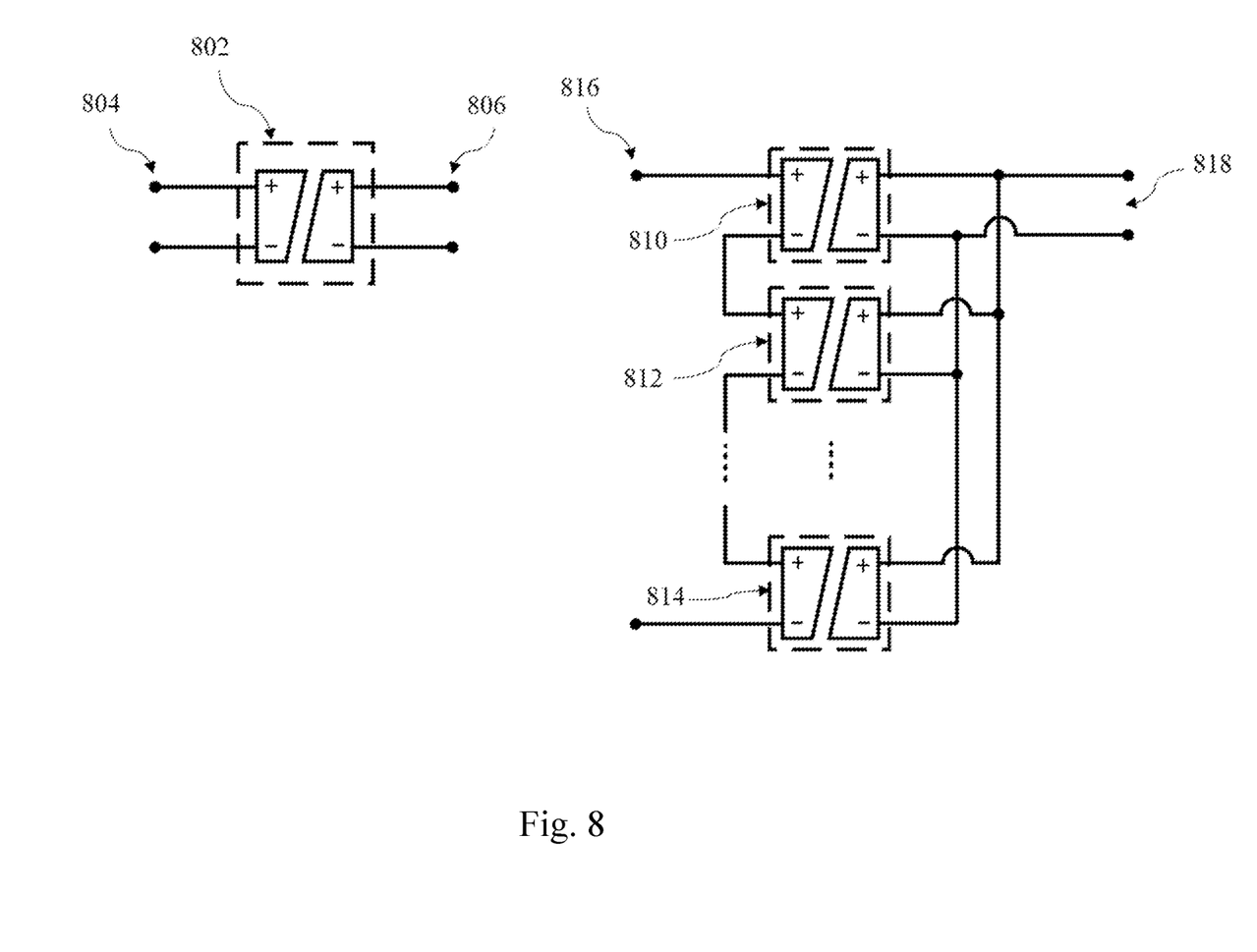
FIG. 8 illustrates series or parallel-connected DC-DC converter modules to achieve a DC-DC converter with increased voltage or current ratings.

FIG. 8 shows a modular configuration to realize the DC-DC converters used in the SST according to the previous figures and embodiments of the invention. DC-DC converter 802 can be realized with a stack of multiple DC-DC converter modules, exemplified by 810, 812 and 814. As an example, a series connection is shown at the input side of the DC-DC converter modules to achieve a higher summed-up voltage handling capability at the input, 816; and a parallel connection is shown at the output side to achieve a higher summed-up current handling capability at the output, 818.

Figure 9:
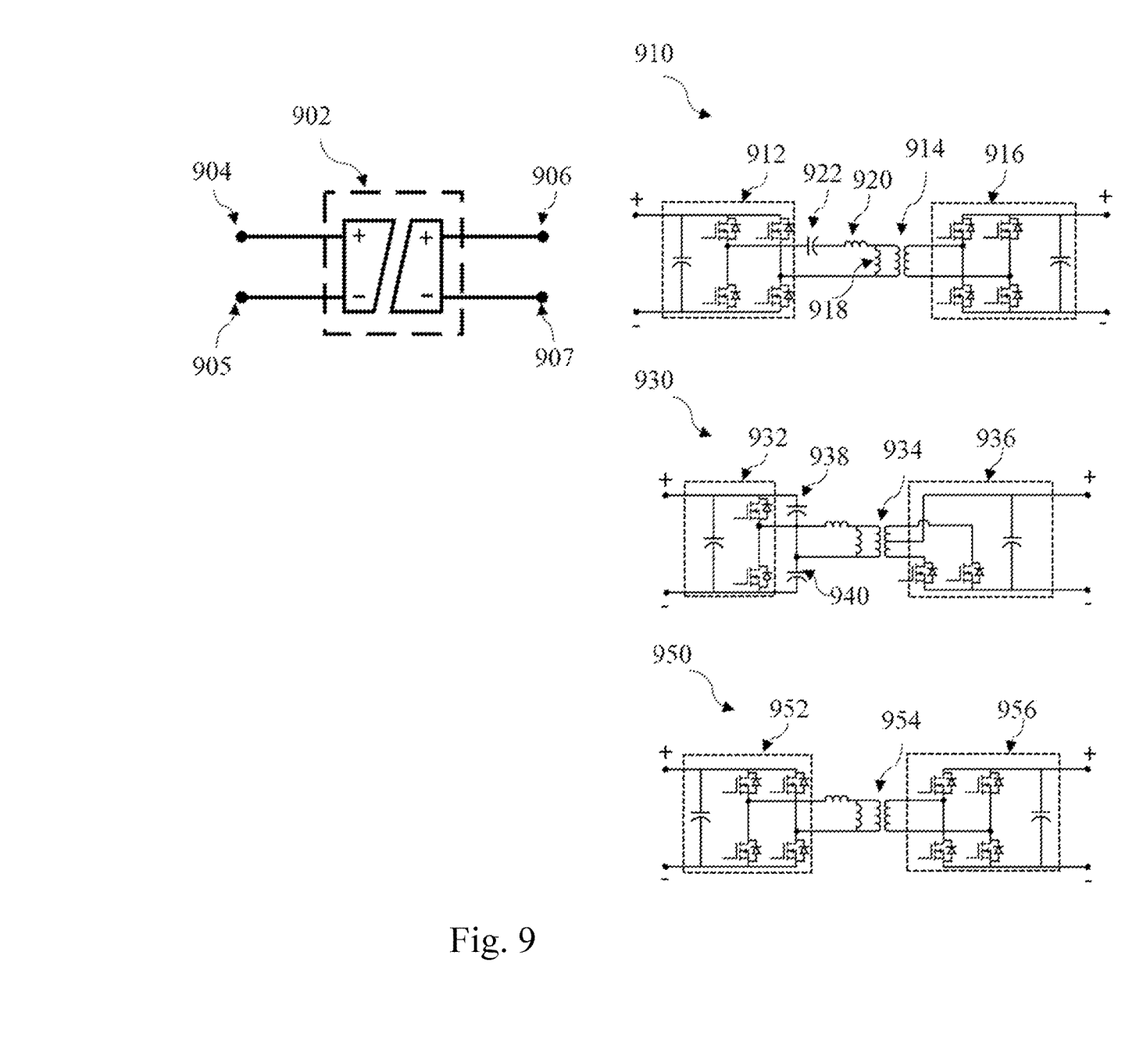
FIG. 9 illustrates exemplary circuits to realize the DC-DC converter used in the solid-state transformer according to one embodiment of the present invention.

FIG. 9 shows exemplary circuits that can be used to realize the DC-DC converter blocks used in the SST according to the aforementioned embodiments of the invention. A resonant converter circuit example, 910, is shown which uses an input switching bridge 912, a transformer 914, and an output switching bridge 916. Resonant capacitor 922, resonant inductor 920, and magnetizing inductance 918 are selected to provide a resonant operation of the circuit with the bridge switches turned on or off at near zero voltages or currents. One or more of the resonant components can optionally be placed on the secondary side of the transformer 914, or distributed between the primary and secondary sides of the transformer. Yet another resonant circuit example, 930, is shown which uses a half-bridge 932 on the input side, a transformer 934 with secondary center-tapped, and a push-pull output stage 936. Resonant capacitors 938 and 940 are placed on the input side. Yet another DC-DC circuit example, 950, uses an input bridge 952, a transformer 954 and an output bridge 956. The DC-DC circuit 950 is optionally operated with a phase-shift between the bridges 952 and 956 to control power flow. This can facilitate soft-switching of the switches within 952 and 956 through energy exchange between the inductive elements in 954 and parasitic capacitances of the switches during switch transitions with turn-on of a switch performed when the voltage across it is substantially near zero. In all three examples, 910, 930 and 950, the freewheeling path through diodes in the bridges 912, 932, and 952, substantially prevents a negative voltage across the inputs and ensures a substantially unipolar voltage across the inputs of the DC-DC converter. During portions of the operation when a substantially zero voltage is present or desired across the input terminals of the DC-DC converter (as exemplified in portions of the waveform shown in 320 of FIG. 3), the switches in the bridges 912, 932, and 952 can be simultaneously closed to provide a low-resistance or low voltage-drop cross-conduction path between the input terminals of the DC-DC converter. A similar mode of operation can be performed on the output side of the DC-DC converter. As another aspect, the DC-DC converter 902 and example circuits 910, 930, and 950 are optionally operated with a fixed transfer ratio between the input and output voltages. This can be accomplished, for example in circuit 910, by tuning resonant elements 920 and 922 to cancel each other at the operating frequency of 910, and operating bridges 912 and 916 in a square-wave mode resulting in the input/output voltage ratio of 910 being substantially the same as the turns ratio of transformer 914.

Figure 10:
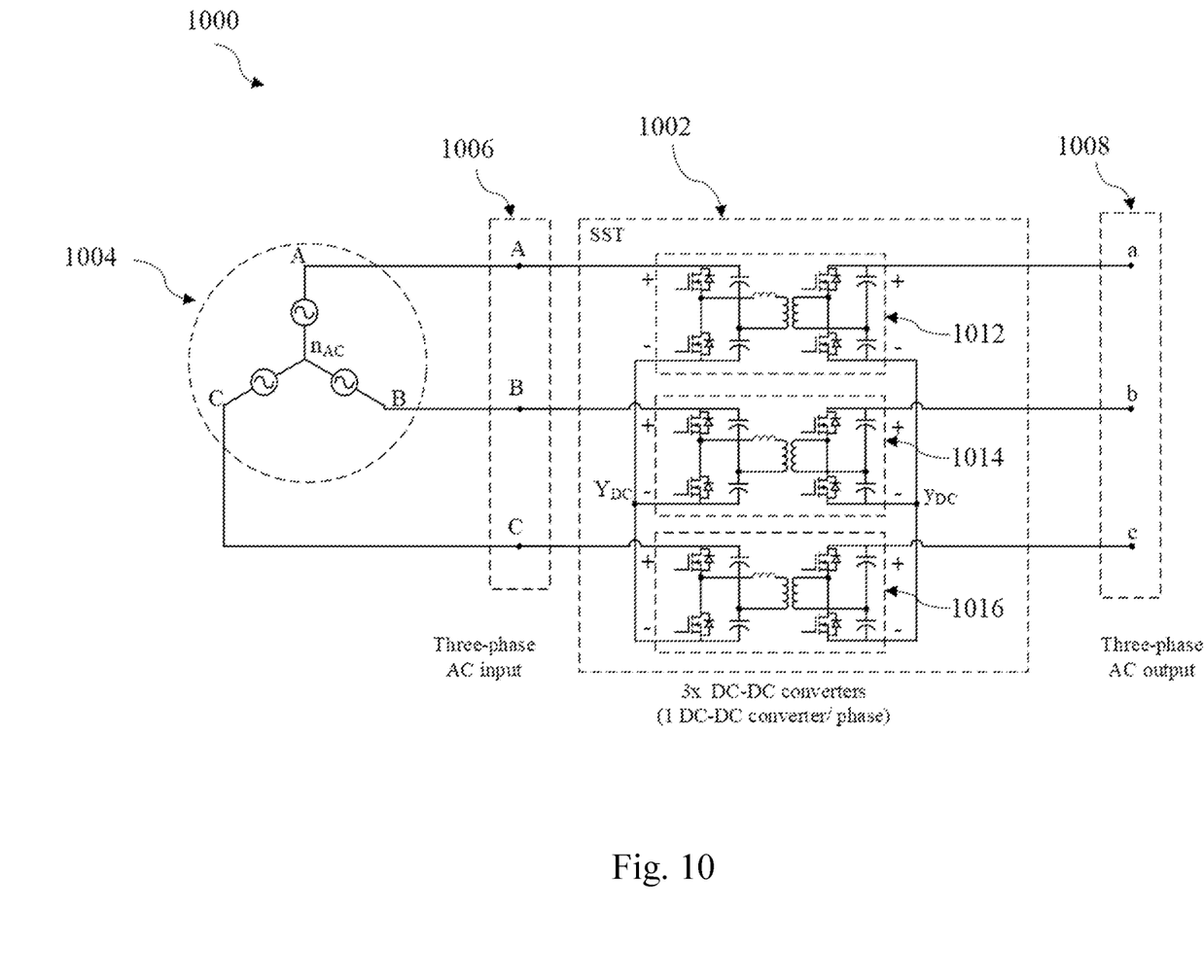
FIG. 10 illustrates an AC system with a solid-state transformer according to one embodiment of the present invention.

FIG. 10 shows a solid-state transformer (SST), 1002, according to an embodiment of the present invention. AC system, 1000, comprises a three-phase AC source 1004, AC source or line impedance 1006 and SST 1002. The three phase AC input terminals (A, B, C) of the SST are denoted by 1006 and the three phase AC output terminals (a, b, c) of the SST are denoted by 1008. The SST comprises three DC-DC converters 1012, 1014, and 1016. The negative input terminals of all three DC-DC converters are connected to a common node, $Y_{DC}$, and their negative output terminals are connected to a second common node, $y_{DC}$. For DC-DC converter 1012, the positive input terminal is connected to input side phase 'A' and the positive output terminal connects to output side phase 'a'. DC-DC converter 1014 is similarly connected to input side phase 'B' and output side phase 'b'; while DC-DC converter is connected to input side phase 'C' and output side phase 'c'.

Figure 11:
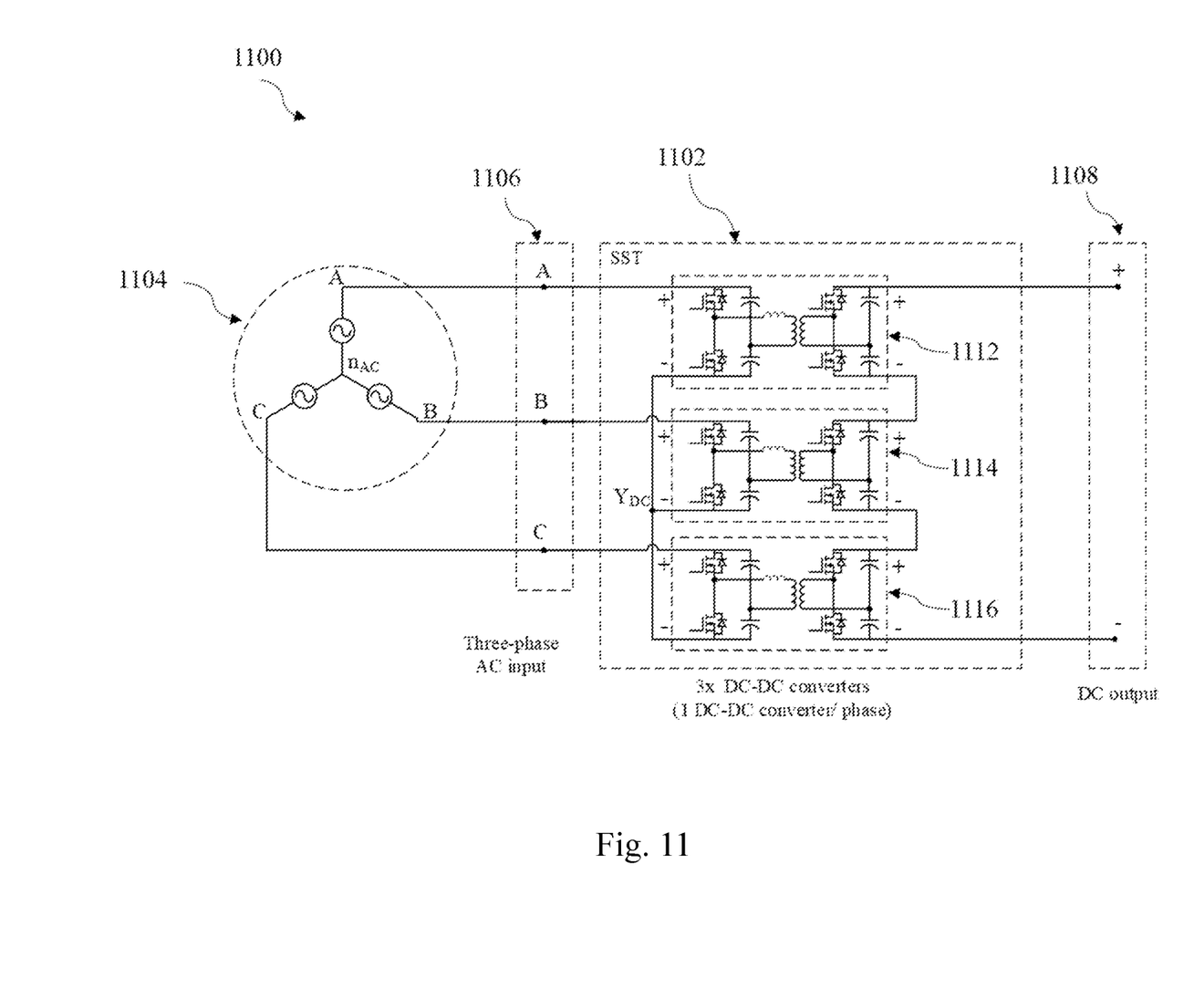
FIG. 11 illustrates an AC system with a solid-state transformer with three-phase AC terminals on a first side and DC terminals on a second side according to one embodiment of the present invention.

FIG. 11 shows a AC-DC solid-state transformer (SST), 1102, according to an embodiment of the present invention. The system, 1100, comprises a three-phase AC source 1104, AC source or line impedance 1106 and SST 1102. The three phase AC input terminals (A, B, C) of the SST are denoted by 1106 and the DC output terminals of the SST are denoted by 1108. The SST comprises three DC-DC converters 1112, 1114, and 1116. The negative input terminals of all three DC-DC converters are connected to a common node, $Y_{DC}$. For the DC-DC converters 1112, 1114, and 1116 the positive input terminals are connected to input phases 'A', 'B' and 'C' respectively. The outputs of the DC-DC converters are connected in series as shown, or in parallel, to provide a DC output 1108. In another embodiment, the arrangement shown in FIG. 11 can be modified with the input positive terminals of the DC-DC converters connected together to a common node, $Y_{DC}$, while the negative input terminals of 1112, 1114 and 1116 are connected to the three phases A, B, and C respectively.

In the foregoing embodiments, the DC-DC converters have unipolar input and output voltages, and either unidirectional or bidirectional current capability to allow power flow in one direction or power flow in either direction between their input and output sides.

The foregoing description of exemplary embodiments of the invention has been presented for the purposes of illustration and description. It is not intended to be exhaustive or to limit the invention to the precise forms disclosed. It will be recognized by those skilled in the art that many modifications and variations are possible without departing from the essential scope of the invention. It is, therefore, to be understood that the scope of the invention is not limited to the particular embodiments disclosed, and that the invention will include all embodiments falling within the scope of the claims appended hereto.

What is claimed is:

1. A solid-state transformer comprising:
a three-phase alternating current (AC) input;
a three-phase AC output; and
three DC-DC converters;
wherein each of the said DC-DC converters has transformer isolation between its input and output; and
wherein each of the said DC-DC converters has a positive input terminal, a negative input terminal, a positive output terminal, and a negative output terminal; and
wherein each of the said DC-DC converters has a substantially unipolar voltage between its said input terminals and a substantially unipolar voltage between its said output terminals; and
wherein each of the said DC-DC converters has its positive input terminal connected to a separate phase of the said three-phase AC input; and
wherein the negative input terminals of each of the said three DC-DC converters are connected together forming a first common node.

2. The solid-state transformer of claim 1:
wherein each of the said three DC-DC converters has its positive output terminal connected to a separate phase of the said three-phase AC output; and
wherein the negative output terminals of each of the said three DC-DC converters are connected together forming a second common node.

3. The solid-state transformer of claim 1:
wherein each of the said three DC-DC converters has its negative output terminal connected to a separate phase of the said three-phase AC output; and
wherein the positive output terminals of each of the said three DC-DC converters are connected together forming a second common node.

4. The solid-state transformer of claim 1:
wherein one or more of the said DC-DC converters comprise a series or parallel combination of DC-DC converter modules.

5. The solid-state transformer of claim 1:
wherein one or more of the said DC-DC converters uses a resonant or soft-switching circuit.

6. The solid-state transformer of claim 1:
wherein one or more of the said DC-DC converters is operated with a substantially fixed voltage transfer ratio between its input and output.

7. The solid-state transformer of claim 1:
wherein the switching devices in one or more of the said DC-DC converters are turned on to provide a cross-conduction path during portions of AC waveform cycles of the said three-phase AC input or the said three-phase AC output.

8. A solid-state transformer comprising:
a three-phase alternating current (AC) input;
a three-phase AC output; and three DC-DC converters;

wherein each of the said DC-DC converters has transformer isolation between its input and output; and wherein each of the said DC-DC converters has a positive input terminal, a negative input terminal, a positive output terminal, and a negative output terminal; and wherein each of the said DC-DC converters has a substantially unipolar voltage between its input terminals and a substantially unipolar voltage between its output terminals; and wherein each of the said DC-DC converters has its negative input terminal connected to a separate phase of the said three-phase AC input; and wherein the positive input terminals of each of the said three DC-DC converters are connected together forming a first common node.

9. The solid-state transformer of claim 8:

wherein each of the said three DC-DC converters has its positive output terminal connected to a separate phase of the said three-phase AC output; and wherein the negative output terminals of each of the said three DC-DC converters are connected together forming a second common node.

10. The solid-state transformer of claim 8:

wherein each of the said three DC-DC converters has its negative output terminal connected to a separate phase of the said three-phase AC output; and wherein the positive output terminals of each of the said three DC-DC converters are connected together forming a second common node.

11. The solid-state transformer of claim 8:

wherein one or more of the said DC-DC converters comprise a series or parallel combination of DC-DC converter modules.

12. The solid-state transformer of claim 8:

wherein one or more of the said DC-DC converters uses a resonant or soft-switching circuit.

13. The solid-state transformer of claim 8:

wherein one or more of the said DC-DC converters is operated with a substantially fixed voltage transfer ratio between its input and output.

14. The solid-state transformer of claim 8:

wherein the switching devices in one or more of the said DC-DC converters are turned on to provide a cross-conduction path during portions of AC waveform cycles of the said three-phase AC input or the said three-phase AC output.

15. A solid-state transformer comprising:

a three-phase alternating current (AC) input;

a DC output; and three DC-DC converters;

wherein each of the said DC-DC converters has transformer isolation between its input and output; and wherein each of the said DC-DC converters has a positive and a negative input terminal, and a positive and a negative output terminal; and wherein each of the said DC-DC converters has a substantially unipolar voltage between its input terminals and a substantially unipolar voltage between its output terminals; and wherein each of the said DC-DC converters has its positive input terminal connected to a separate phase of the said three-phase AC input; and wherein the negative input terminals of each of the said three DC-DC converters are connected together forming a first common node; and wherein the output terminals of the said three DC-DC converters are connected in series or parallel or a combination thereof.

16. A solid-state transformer comprising:

a three-phase alternating current (AC) input;

a DC output; and three DC-DC converters;

wherein each of the said DC-DC converters has transformer isolation between its input and output; and wherein each of the said DC-DC converters has a positive input terminal, a negative input terminal, a positive output terminal, and a negative output terminal; and wherein each of the said DC-DC converters has a substantially unipolar voltage between its input terminals and a substantially unipolar voltage between its output terminals; and wherein each of the said DC-DC converters has its negative input terminal connected to a separate phase of the said three-phase AC input; and wherein the positive input terminals of each of the said three DC-DC converters are connected together forming a first common node; and wherein the output terminals of the said three DC-DC converters are connected in series or parallel or a combination thereof.

* * * * *